Aug. 10, 1965 E. KRESTEL 3,200,278
MEASURING AND CONTROLLING DYNAMO-ELECTRIC
MACHINE COMMUTATION
Filed Aug. 8, 1961 3 Sheets-Sheet 1
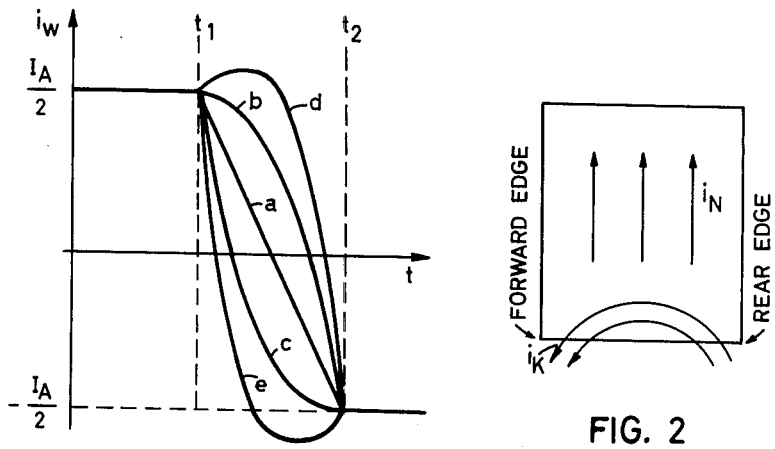
FIG. 1
FIG. 2
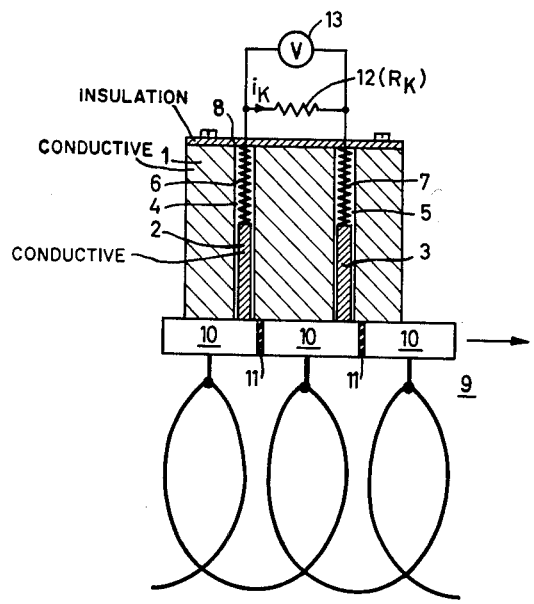
FIG. 3

United States Patent Office 3,200,278
Patented Aug. 10, 1965

3,200,278
MEASURING AND CONTROLLING DYNAMO-ELECTRIC MACHINE COMMUTATION
Erich Krestel, Erlangen, Germany, assignor to Siemens-Schuckertwerke Aktiengesellschaft, Berlin-Siemensstadt, Germany, a corporation of Germany
Filed Aug. 8, 1961, Ser. No. 130,021
Claims priority, application Germany, Aug. 12, 1960, S 69,901; Nov. 15, 1960, S 71,267
6 Claims. (Cl. 310—225)

My invention relates to a device for measuring the short-circuit current that occurs in the brushes on the commutators of electric machines.

It is an object of my invention to readily afford such current measurements on normal, installed commutator machines during their operation and while the periodic commutation and corresponding current reversal in the machine windings being commutated takes place.

The conventional method of measuring such brush short-circuit currents is to determine the current magnitudes indirectly by point-to-point field measurements or by a rather intricate measuring of the coil current being reversed during the commutating interval. In the latter case, however, the measuring operation cannot be performed on a conventional installed and normally operating machine. It is rather necessary to drill a bore into the rotor shaft and to provide the shaft with particular slip rings for a measuring circuit, to which slip rings a measuring resistance connected to a rotor coil is attached. However, it is often desirable to accurately ascertain the brush short-circuit current during normal running of the machine with simple means in order to properly adjust the interpoles (commutation poles) of direct-current machines. Such interpoles have the purpose to prevent sparking at the commutator brushes, mainly depending upon the course of the reversing current in the particular rotor coil that is short-circuited by the commutator brushes at a time. The time curve of the reversing current, in turn, depends upon whether a short-circuiting current is being induced in the coil just being short-circuited by the brush, and if so, in which direction such current is flowing.

The object of my invention of providing a simple and reliable device for the operational measuring of brush short-circuit currents during normal machine operation, and the means provided by the invention for achieving this object, will be more fully explained and described hereinafter with reference to the accompany drawings, in which:

FIG. 1 is explanatory and shows a current-time graph of the reversing current that may occur in a commutator brush;

FIG. 2 is an explanatory diagram of a commutator brush showing an example of the directions in which the component currents may flow in the brush;

FIG. 3 is a schematic and partly sectional illustration of a commutator brush and measuring device according to the invention;

Figure 4:
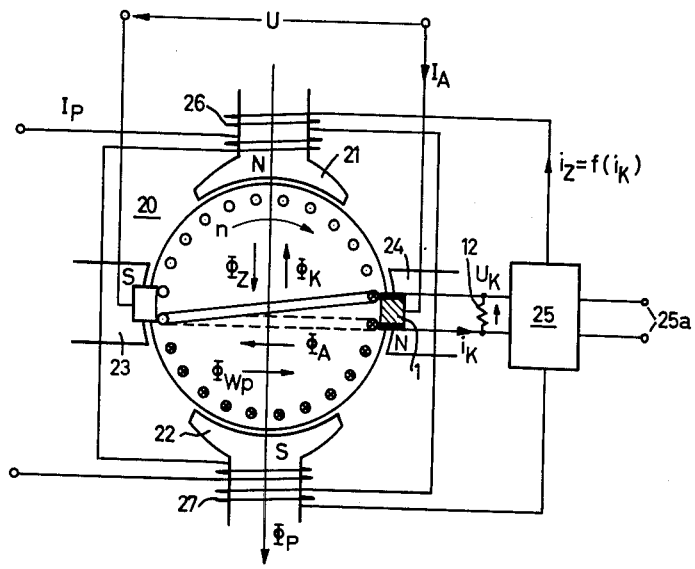
FIG. 4 shows schematically the circuit diagram of a direct-current machine equipped with a measuring device according to the invention serving as part of a control system for the same machine.

In the explanatory graph of FIG. 1 the abscissa denotes time $t$ and the ordinate denotes the current $i_w$ which passes through a single commutator brush and which changes its direction during the commutating interval between the moments $t_1$ and $t_2$. The curve $b$ is typical of the so-called "late commutation" which occurs in the absence of interpoles (commutation poles) because of the self-induction of the coil being commutated and which has a delaying action upon the reversal in the current flow direction. However, when the stray inductivity of the commutating coil is relatively great, or when in uncompensated machines the field of the armature reaction acting in the same sense is relatively great, then the commutation current has the characteristic of a low-current reversal according to curve $1d$. If the field of the armature reaction and the self-induction voltage are compensated with the aid of interpoles, or if the armature reaction is eliminated by compensating windings, then a linear current reversal in accordance with the straight line $a$ is obtained. In the event of over-compensation, an advanced commutation according to curve $c$ is obtained, and with a still more excessive overcompensation an over-current commutation according to curve $e$ will occur.

The reversing (commutating current) occurring in the short-circuited rotor coil is composed according to FIG. 2 of the useful load current $i_N$ and the brush short-circuit current $i_K$. The useful current $i_N$, taken by itself, has a uniform current density over the cross section of the brush. It will be recognized from FIG. 2, showing a brush short-circuit current as flowing in the event of delayed commutation (curve $b$ in FIG. 1) that the two currents $i_N$ and $i_K$ are cumulative in the brush contact area on the side of the rear (lagging) edge so that an increased current density is present in the vicinity of this edge. However, in the forward (leading) edge of the brush the two currents have mutually opposed directions. Hence they compensate each other partially or entirely so that the current density in this portion of the brush is very slight or virtually equal to zero. With a linear commutation (curve $a$ in FIG. 1) no brush short-circuit current will flow. With advanced commutation (curve $c$) the brush short-circuit current has the opposed direction and hence flows in FIG. 2 from the left toward the right. This has the result of producing a slight or zero current density in the lagging brush edge. It is, therefore, necessary, for avoiding sparkling at the brush, to operate with early commutation (curve $c$) which is to proceed in such a manner that the current density at the lagging edge comes as close as feasible to the zero value. The high current density then occurring at the leading edge of the brush has no detrimental effect.

It will be understood from the foregoing that the magnitude and direction of the short-circuit current offers a measure for the type of current commutation. In order to measure the brush short-circuit current with simple means during normal operation, the device according to the invention is provided with two conductors that are in contact with the commutator segments and which are spaced from each other along the commutator periphery a minimum distance corresponding approximately to the peripheral width of the commutator segments. These two conductors are connected with each other by a measuring resistor which, during operation, develops a voltage drop that is taken as a measure of the brush short-circuit current.

The device, as exemplified by the embodiment shown in FIG. 3 is preferably given the same dimensions as the carbon brushes ordinarily used in the same electric machine. The measuring brush according to FIG. 3 is either inserted into a separate brush holder and brought into contact with the commutator, or it is simply inserted in lieu of a normal carbon brush into the brush holder of a machine. The measuring brush comprises an insulating brush body 1 which has two parallel bores 4 and 5 extending in radial relation to the commutator which in FIG. 3 is shown in developed, planar form. Slidably inserted into the two bores 4 and 5 are respective conductors 2 and 3 consisting of copper sheet material, copper wires or carbon panes. The conductors 2 and 3 are forced against the commutator 9 by means of respective helical springs 6 and 7 which are braced against a cover plate 8 fastened to the top of the brush body. The individual segments 10 of the commutator are separated from each other by respective gaps 11. The width of the individual conductors 2 and 3 in the peripheral direction of the commutator is somewhat greater than that of each gap 11 in order to prevent damaging the conductors during operation. The distance between the two conductors 2 and 3 is approximately equal to the peripheral width of an individual commutator segment.

Outside of the brush body 1, the two conductors 2 and 3 are electrically connected with each other by a voltage drop resistor 12. Connected in parallel relation to the resistor 12 is a voltmeter 13 which is so calibrated that it directly indicates the brush short-circuit current flowing through the measuring resistor 12. With linear commutation (curve a, FIG. 1) there is no brush short-circuit current. With advanced commutation a brush short-circuit current flows in one direction and with delayed commutation a short-circuit current in the other direction through the measuring resistance and thus results in a deflection of the voltmeter in one or the other direction. The measuring brush device, therefore, responds serially to the respective brush short-circuit currents in the coils of the rotor winding. Consequently, in contrast to known measuring methods, not only the brush short-circuit current in a single coil is responded to, but the brush short-circuit currents in all rotor coils are measured so that a continuous direct current passes through the measuring brush, the resistor and through the indicating instrument.

As mentioned, the inter (commutation) poles are so adjusted that advance commutation takes place in order to prevent the occurrence of sparking at the brushes. In this case, the brush short-circuit current flowing in the short-circuited coil causes a magnetic flux $\phi_K$, which reduces the field in a motor and increases the field in a generator. When the brush short-circuit current $i_K$ changes, it causes in the case of a motor, a variation in rotating speed and in the case of a generator a variation in generated voltage. The variation in the event of load changes, causes the occurrence of pendulous or fluctuating phenomena because the load current flows through the windings of the interpoles and causes variations in brush short-circuit current when abrupt changes in load take place. The field of the brush short-circuit current changes the intensity of the main field, and this change is the greater the farther the working point of the machine is located outside of the saturated range of the magnetic characteristic. The main field is also influenced by the armature reaction. However, this reaction can be reduced to a great extent by a corresponding design of the machine.

It is known to prevent the above-mentioned hunting phenomena due to brush short-circuit currents, by providing an additional excitation winding on the main pole of the machine and to pass the rotor current through the additional winding so that it produces an additional field $\phi_Z$ which is directed in opposition to the field $\phi_K$ and is of the same magnitude. This known expedient secures only a static stability. The requirements for dynamic stability at the nowadays increasing demand for greater control ranges, however, are satisfied only to an unsatisfactory extent. Furthermore, the just-mentioned expedient cannot be employed for reversible drives because either the direction of the main field or that of the rotor field must be reversed when the driving direction is being reversed. With such reversal, however, the additional field $\phi_Z$ would become active in the same direction as the field $\phi_K$ so that the latter would no longer be compensated.

It is, therefore, another object of my invention to also avoid these disadvantages and to achieve a compensation of the field $\phi_K$ under any operating conditions even in the case of reversible drives. To this end, and in accordance with another feature of my invention, the current of the additional excitation winding is controlled in dependence upon the brush short-circuit $i_K$. The control of the compensation of the field magnitude $\phi_K$ in dependence upon the error magnitude, i.e. upon the brush short-circuit current, has the further advantage that with a selection of suitable transmission members, the time constant can be kept very short.

Since with advanced commutation the field $\phi_K$ also maintains its direction when the running direction of the machine is reversed, and hence the additional current $i_Z$ must always flow in the same direction, this current can be supplied from a separate current source. The magnitude of this additional current can be made proportional to the brush short-circuit current $i_K$ by means of a control device, so that the field $\phi_K$ is always compensated by the field $\phi_Z$.

A control system embodying the above-mentioned features is illustrated in FIG. 4. Shown is a direct-current machine 20 with main poles 21, 22 and commutation (inter) poles 23 and 24. For simplicity, and as customary in such schematic diagrams, the contact brushes are shown symbolically to be in engagement with the conductors as the rotor winding instead of with the segments of a commutator. Two brushes are shown of which one namely the brush 1 is designed as a measuring brush 1. This brush is in accordance with the one illustrated in FIG. 3 and has two current drawing conductors between which a measuring resistor 12 is connected. The measuring voltage $U_K$ across resistor 12 is applied to the input stage of a controlling amplifier 25 energized at terminals 25a from a suitable current source (not illustrated). The output circuit of the amplifier 25 feeds additional excitation windings 26 and 27 which are connected in series with each other. The amplifier 25 may consist, for example of an electronic-tube amplifier or a transistor amplifier of conventional type.

Figure 5:
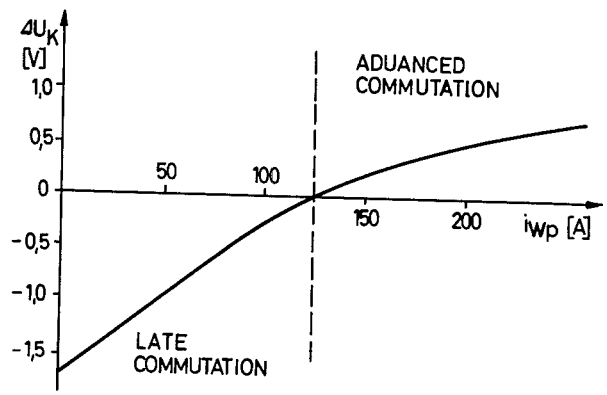
FIG. 5 is a current-voltage graph illustrating the voltage drop of the brush short-circuit current as a function of the interpole current measured with a non-compensated machine.

FIG. 5 is a graph indicating the dependence of the voltage drop $\Delta U_K$ of the brush short-circuit current $i_K$ at the resistor $R_K$ (12 in FIG. 4) as a function of the interpole current $i_{wp}$ measured with a non-compensated machine of 17 kw. When the interpole field is not switched on, the brush short-circuit current and hence $\Delta U_K$ have the largest value. With a given reversing current $i_{wp}$, the brush short-circuit current becomes equal to zero, and with a further increase of the reversing current the brush short-circuit current flows in the other direction. From the curvature of the characteristic existing in the range of advanced commutation, it is apparent that the interpoles approach saturation with increasing current flow through the interpole windings.

While for merely measuring the short-circuit current a long lifetime of the measuring brushes is not of decisive importance, it is essential that the measuring brush possesses a useful lifetime approximately equal to that of normal commutator brush when the measuring brush is used for the control of additional excitation fields of the type exemplified in FIG. 4. In such cases care must be taken to give the measuring brush a stable and rugged design. An advantageous design of this type comprises two carbon pieces with a layer of insulating material of lesser hardness than carbon between the carbon pieces. The thickness of the insulating layer is made approximately equal to the width of a commutator segment.

The carbon pieces may be made of the same material as ordinary commutator brushes and hence have the same strength and the same contact resistance. Insulating materials which are softer than brush carbon are available in a great variety of substances. For example, the material available under the trade-name "Pertinax" is applicable for this purpose.

Figure 6:
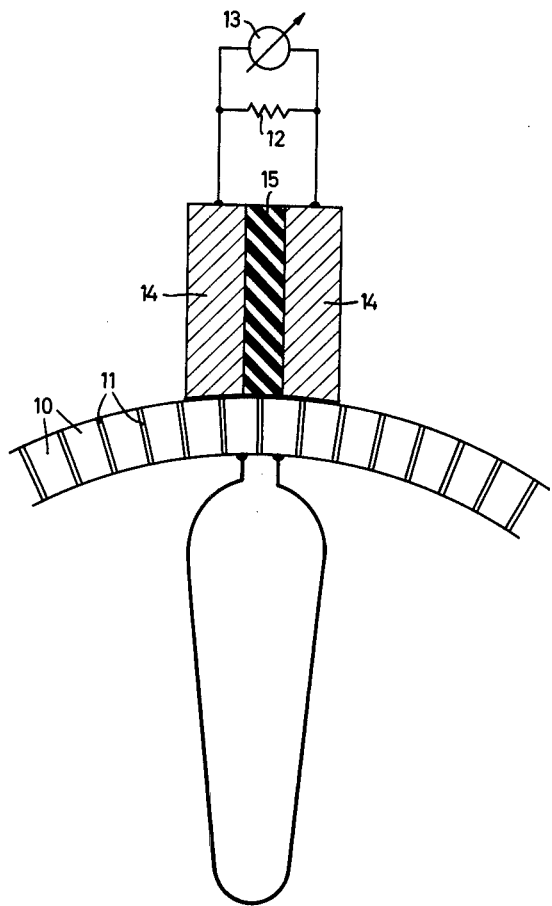
FIG. 6 is a partial and sectional view of another embodiment of a measuring device according to the invention.

The device shown in FIG. 6 embodies the above-mentioned features. The collector segments 10 are separated from each other by respective gaps 11. An individual segment being commutated is shown connected to two sequential segments. The measuring brush consists of two carbon pieces 14 and an intermediate layer 15 of insulating material. The thickness of the layer 15 corresponds approximately to the width of a segment 10. Connected across the two carbon pieces 14 is a measuring resistor 12 and a voltmeter 13 as explained in the foregoing. The thickness of the carbon pieces 14 can be chosen within wide limits and can readily be adapted to that of normal brushes. The measurement of the brush short-circuit current is not impaired by changes in such thickness.

The individual parts of the measuring brushes can be connected with each other by cementing or by suitable insulating screw bolts or rivets. Due to the compact design of the measuring brushes they may be permitted to continuously glide on the commutator if required for control and regulating purposes.

In order to prevent the two half-portions of the measuring brush, such as the two carbon pieces 14 in FIG. 6 from being short-circuited by the brush holder, the inner walls of the brush holder are lined with insulating material. This can be done by means of a sheet of synthetic material, or the inner walls of the brush holder may be coated with casting resin. It is also preferable to take care that the measuring brushes are insulated from those structural parts that are conventionally used for pressing the brush against the commutator.

While preferred embodiments of the invention have been described in detail it will be obvious to those skilled in the art that the invention may be practiced otherwise within the scope of the following claims.

I claim:

1. With an electric machine having a commutator and contact brushes engaging said commutator, the combination of a device for measuring the brush short-circuit current comprising a brush body having two mutually insulated conductor members engaging the commutator when in operation and being spaced from each other at the respective points of engagement a minimum distance equal to the peripheral width of the commutator segments, a resistor connected between said two conductor members and having a voltage drop proportional to the brush short-circuit current, and measuring means connected with said resistor for measuring said voltage.

2. With an electric machine having a commutator and contact brushes engaging said commutator, the combination of a device for measuring the brush short-circuit current comprising a brush body of insulating material having two passages extending in substantially perpendicular direction with respect to the commutator and being spaced from each other a distance equal to the peripheral width of the commutator segments, two mutually insulated conductor members displaceable in said respective passages, said conductor members being movable relative to said insulating material, spring means engaging said respective conductor members so as to urge them toward the commutator side of said brush body, a resistor connected between said two conductor members and having a voltage drop proportional to the brush short-circuit current, and measuring means connected with said resistor for measuring said voltage.

3. In a measuring device according to claim 1, said conductor members consisting of carbon pieces, and said brush body having a layer of insulating material disposed between said two carbon pieces and rigidly joined therewith.

4. In a measuring device according to claim 1, said conductor members consisting of carbon pieces, and said brush body having a layer of insulating material disposed between said two carbon pieces and rigidly joined therewith, said insulating layer having smaller hardness than said carbon pieces.

5. With an electric machine having rotor windings, a commutator with segments to which said windings are connected, contact brushes engaging said commutator, and field means with additional excitation windings, the combination of a device for measuring the brush short-circuit current comprising a brush body having two mutually insulated conductor members engaging the commutator when in operation and being spaced from each other at the respective points of engagement a minimum distance equal to the peripheral width of the commutator segments, a resistor connected between said two conductor members and having a voltage drop proportional to the brush short-circuit current, and circuit means connected between said resistor and said excitation windings for controlling their excitation in dependence upon said measured voltage drop so as to continuously compensate the flux of the rotor winding being commutated.

6. With an electric machine having main field poles, compensating windings on said poles, rotor windings, a commutator with segments to which said rotor windings are connected, and contact brushes engaging said commutator, the combination of a device for measuring the brush short-circuit current comprising a brush body having two mutually insulated conductor members engaging the commutator when in operation and being spaced from each other at the respective points of engagement a minimum distance equal to the peripheral width of the commutator segments, a resistor connected between said two conductor members and having a voltage drop proportional to the brush short-circuit current, and measuring means having an amplifier connected with said resistor to be controlled by said voltage drop, said amplifier having an output circuit connected with said compensating windings for exciting them in proportion to said voltage drop to compensate the flux of the rotor winding being commutated.

References Cited by the Examiner

UNITED STATES PATENTS

| | | | |
|---|---|---|---|
| 1,059,134 | 4/13 | Fornander | 310—248 X |
| 1,335,144 | 3/20 | Walker | 310—224 |

ORIS L. RADER, *Primary Examiner.*

WALTER L. CARLSON, *Examiner.*